US011125574B2

(12) United States Patent
Fowe

(10) Patent No.: US 11,125,574 B2
(45) Date of Patent: Sep. 21, 2021

(54) NAVIGATION OPTIMIZED FOR UNEXPECTED TRAFFIC EVENTS

(71) Applicant: HERE Global B.V., Eindhoven (NL)

(72) Inventor: James Fowe, Chicago, IL (US)

(73) Assignee: HERE GLOBAL B.V., Eindhoven (NL)

(*) Notice: Subject to any disclaimer, the term of this patent is extended or adjusted under 35 U.S.C. 154(b) by 306 days.

(21) Appl. No.: 15/962,745

(22) Filed: Apr. 25, 2018

(65) Prior Publication Data
US 2019/0331502 A1 Oct. 31, 2019

(51) Int. Cl.
G01C 21/34 (2006.01)
G06F 16/951 (2019.01)
G06F 16/29 (2019.01)

(52) U.S. Cl.
CPC ..... *G01C 21/3492* (2013.01); *G01C 21/3446* (2013.01); *G06F 16/29* (2019.01); *G06F 16/951* (2019.01)

(58) Field of Classification Search
CPC .................................................. G01C 21/3492
See application file for complete search history.

(56) References Cited

U.S. PATENT DOCUMENTS

| | | | | |
|---|---|---|---|---|
| 5,610,821 A * | 3/1997 | Gazis | ................. | G01C 21/3492 340/990 |
| 7,912,628 B2 * | 3/2011 | Chapman | ............. | G08G 1/0141 701/117 |
| 8,249,810 B2 * | 8/2012 | Jones | ................. | G01C 21/3446 701/400 |
| 9,200,910 B2 | 12/2015 | Fowe | | |
| 9,257,041 B2 * | 2/2016 | Scofield | ............... | G08G 1/0104 |
| 9,459,106 B2 | 10/2016 | Konig | | |
| 10,086,999 B2 * | 10/2018 | Stadie | .................... | B65G 1/065 |
| 10,133,275 B1 * | 11/2018 | Kobilarov | ............... | G06N 3/08 |
| 10,474,141 B2 * | 11/2019 | Stadie | ............. | G05B 19/41895 |
| 10,502,579 B2 * | 12/2019 | Fowe | ................. | G01C 21/3484 |
| 10,546,248 B2 * | 1/2020 | Johnson | ................. | G06N 20/00 |

(Continued)

FOREIGN PATENT DOCUMENTS

| | | |
|---|---|---|
| CN | 105352522 A | 2/2016 |
| WO | WO 2014/001549 A1 | 1/2014 |
| WO | WO 2017/124331 A1 | 7/2017 |

OTHER PUBLICATIONS

Extended European Search Report for Application No. 19 17 1082 dated Dec. 3, 2019, 11 pages.

(Continued)

*Primary Examiner* — Michael A Berns
(74) *Attorney, Agent, or Firm* — Alston & Bird LLP

(57) ABSTRACT

A method performed by at least one apparatus is described, said method comprising: obtaining a routing request for determining a route between a first position and a second position in a transport network of a map; determining or triggering determining alternate routes between said first position and said second position at least based on costs of a first cost type for travelling a respective route; and determining or triggering determining costs of a second cost type for travelling a respective route for at least one of said alternate routes, wherein said second cost type is based on a probability of an unexpected traffic event on a respective route.

38 Claims, 6 Drawing Sheets

(56) References Cited

U.S. PATENT DOCUMENTS

| | | | |
|---|---|---|---|
| 10,908,614 B2* | 2/2021 | Fowe | G06K 9/00805 |
| 2002/0128766 A1 | 9/2002 | Petzold et al. | |
| 2015/0253144 A1 | 9/2015 | Rau et al. | |
| 2017/0082453 A1 | 3/2017 | Fischer et al. | |
| 2018/0174447 A1* | 6/2018 | Pellolio | G08G 1/052 |
| 2018/0309592 A1* | 10/2018 | Stolfus | H04L 12/4625 |

OTHER PUBLICATIONS

A* search algorithm—Wikipedia [online] [retrieved Nov. 6, 2019]. Retrieved from the Internet: https://web.archive.org/web/20180520160927/https://en.wikipedia.org/wiki/A*_search_algorithm (dated May 17, 2018) 11 pages.

k shortest path routing—Wikipedia [online] [retrieved Nov. 6, 2019]. Retrieved from the Internet: https://web.archive.org/web/20170711134453/https://en.wikipdia.org/wiki/K_shortest_path_routing (dated May 29, 2017) 6 pages.

Depth-first search—Wikipedia [online] [retrieved Nov. 6, 2019]. Retrieved from the Internet: https://web.archive.org/web/2018032621636/https://en.wikipedia.org/wiki/Depth-first_search (dated Mar. 1, 2018) 7 pages.

Dijkstra's algorithm—Wikipedia [online] [retrieved Nov. 6, 2019]. Retrieved from the Internet: https://en.wikipedia.org/w/index.php?title=Dijkstra%27s_algorithm&oldid=832284506 (dated Mar. 25, 2018) 11 pages.

Partial European Search Report for Application No. EP 19 17 1082 dated Sep. 2, 2019, 12 pages.

Hua, M. et al., *Probalistic Path Queries In Road Networks: Traffic Uncertainty Aware Path Selection*, EDBT (Mar. 2010), 12 pages.

Office Action for European Application No. 19171082.1 dated Dec. 17, 2020, 5 pages.

* cited by examiner

| k | Journey Time <float> | PTCS Cost <float> | Alternate Routes <integer> |
|---|---|---|---|
| 1 | time in seconds | $PTCS_{k=1}$ | Leaf_count |
| 2 | time in seconds | $PTCS_{k=2}$ | Leaf_count |
| 3 | ... | ... | ... |
| ... | ... | ... | ... |
| K | time in seconds | $PTCS_{k=K}$ | Leaf_count |

Fig.5

| k | 1/JT <float> | 1/PTCS <float> | Leafs <integer> | Total Cost <float> |
|---|---|---|---|---|
| 1 | per seconds | $1/PTCS_{k=1}$ | Leaf_count | ... |
| 2 | per seconds | $1/PTCS_{k=2}$ | Leaf_count | ... |
| ... | ... | ... | ... | ... |
| K | per seconds | $1/PTCS_{k=K}$ | Leaf_count | ... |

Fig.6

NAVIGATION OPTIMIZED FOR UNEXPECTED TRAFFIC EVENTS

FIELD OF THE INVENTION

The invention relates to the field of navigation methods and intelligent transportation systems specifically optimized for traffic-aware routing, particularly with regard to unexpected traffic events and en-route changes.

BACKGROUND OF THE INVENTION

Intelligent traffic systems (ITS) are used as an advanced application which aims to provide innovative services relating to different modes of transport and traffic management and enable users to be better informed and make safer, more coordinated and smarter use of transport networks. For an intelligent routing and navigation, a routing and navigation system may utilize real-time traffic information. For instance, today's routing systems may use current traffic estimates for finding a fastest route from an origin "0" to a destination "D".

However, in many cases, the traffic condition may change en-route on the journey form the origin to the destination. In the best case, it is possible (with certain navigation systems) to quickly determine a faster route and to advise a user (e.g. a driver) to re-route in order to avoid a sudden (i.e. unexpected) congestion ahead. Nevertheless, this may still lead to a later estimated time of arrival (ETA). In some cases, however, there is actually no alternate route to avoid the unexpected congestion, because the branch-off or junction for the alternate route has already been missed before the congestion event formed.

It is generally possible to take regular traffic congestion into account. However, today's navigation systems will assume that traffic congestions take place as expected from a historic traffic patterns ("expected traffic congestions"). An optimal route will then be selected based on a corresponding ETA calculation. However, this is still found to be non-optimal and inefficient in helping a user find the fastest path. This is because traffic is far more dynamic than a static and consistent (historic) traffic pattern. This approach may be improved e.g. by using up-to-date and real-time traffic information at the time, when the user is at the origin "0".

However, this approach is again found to be non-optimal, because the traffic conditions may still change unexpectedly during the journey. Again, one may have the situation that the (new) optimal route cannot be taken anymore, as it has already been missed before the unexpected change of the traffic condition.

As a result, traffic-aware routing and navigation systems are not working satisfactory and still do not give users the best route choice. This specifically worsens the user experience, because for many users (e.g. commuters) traffic is one of the main reasons why they would use a navigation system. However, if the ETA is poor and they still bump into traffic congestions, which would have been avoidable, the user experience is disappointing.

SUMMARY OF SOME EMBODIMENTS OF THE INVENTION

It may thus be an object of the invention to optimize the routing capabilities of routing and navigation devices. It may also be an object of the invention to optimize the suggestions of routes and/or to increase the reliability and confidence of routing predictions, such as an estimated time of arrival. It may also be an object of the invention to increase the user experience for users (e.g. drivers or passengers) using routing and navigation devices.

According to an exemplary aspect of the invention, a method performed by at least one apparatus is described, said method comprising:
- obtaining a routing request for determining a route between a first position and a second position in a transport network of said map;
- determining or triggering determining alternate routes between said first position and said second position at least based on costs of a first cost type for travelling a respective route; and
- determining or triggering determining costs of a second cost type for travelling a respective route for at least one of said alternate routes, wherein said second cost type is based on a probability of an unexpected traffic event on a respective route.

This method may for instance be performed and/or controlled by an apparatus, for instance by a mobile device and/or a server.

According to a further exemplary aspect of the invention, a computer program code is described, said computer program code, when executed by a processor, causing an apparatus to perform a method according to the exemplary aspect of the invention.

The computer program may be stored on computer-readable storage medium, in particular a tangible and/or non-transitory medium. The computer readable storage medium could for example be a disk or a memory or the like. The computer program could be stored in the computer readable storage medium (e.g. according to the exemplary aspect of the invention) in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention a non-transitory computer readable storage medium in which computer program code is stored is described, said computer program code when executed by a processor causing at least one apparatus to perform a method according to the exemplary aspect of the invention. The storage medium may be a tangible storage medium, for example a tangible computer-readable storage medium. The storage medium may be a storage medium of a navigation device and/or for a navigation device, for example an apparatus according to the exemplary aspect of the invention.

According to a further exemplary aspect of the invention an apparatus is described, comprising means for performing a method according to the exemplary aspect of the invention. The means of the apparatus may be implemented in hardware and/or software. They may comprise for instance at least one processor for executing computer program code for realizing the required functions, at least one memory storing the program code, or both. Alternatively, they could comprise for instance circuitry that is designed to realize the required functions, for instance implemented in a chipset or a chip, like an integrated circuit. In general, the means may comprise for instance one or more processing means such as a processor and a memory. Optionally, the apparatus may comprise various other components, like a communication interface, a network interface, a radio interface, a data interface, a user interface etc.

According to a further exemplary aspect of the invention an alternative apparatus is also described, comprising at least one processor and at least one memory including computer program code, wherein said at least one memory and said computer program code are configured to, with said at least one processor, cause said apparatus to perform a method according to the exemplary aspect of the invention.

The above-disclosed apparatus according to any aspect of the invention may be a module or a component for a device, for example a chip. Alternatively, the disclosed apparatus according to any aspect of the invention may be a device, for instance a personal navigation device (PND) or a server. The disclosed apparatus according to any aspect of the invention may comprise only the disclosed components, for instance means, processor, memory, or may further comprise one or more additional components.

In the following, exemplary features and exemplary embodiments of all aspects of the present invention will be described in further detail.

A transport network may be understood to be a spatial network, e.g. describing a structure which permits movement of a user, in particular by means of a vehicle (e.g. wagon, bicycle, motor vehicle (motorcycle, car, truck, bus), railed vehicle (train, tram)). Examples of a transport network are a network of roads, streets or railways. The transport network may thus be understood to be a travel network.

A transport network of a map may thus be understood to represent a specific physical transport network of a geographic region on the (surface of the) earth. A transport network of a map may be understood to be a data structure representing the corresponding physical transport network. For example, the map may represent a two- or three-dimensional specific geographic region on earth with the respective transport (e.g. road, trail and/or rail) network of the specific geographic region on earth. The map may for instance comprise or be realized with map data. The map data may be part of navigation data of the apparatus.

The map data or the transport network of the map may in particular define or comprise (routing) nodes and/or (routing) segments (also called links or arcs) between corresponding nodes. The nodes and segments may then represent (at least a part of) a respective physical transport (e.g. a road, trail and/or rail) network of the corresponding geographic region.

Accordingly, a route may comprise one or more (e.g. a plurality of) nodes and/or one or more (e.g. a plurality of) segments.

The first position may be a starting position or origin of the route to be determined (e.g. a starting node or origin node). The first position may in particular be a current position of the user or a navigation device of the user. The second position may in particular be a final position or destination of the route to be determined (e.g. a final node or destination node). Therein, the term first and/or second position may likewise be used to refer to a position in the transport network of the map and to a position in the geographic region or transport network represented by the map.

A routing request may in particular comprise information representing said first position and/or said second position. Said routing request may be input by user into a navigation device, so that the routing request is obtained at the navigation device. The routing request may also be comprised by signal, which may be received at a (remote) server, e.g. in a wireless and/or wire bound manner.

Generally, the costs of a route or segment of the transport network of the map may be understood as the cost when travelling along said route or segment in the (physical) transport network represented by the transport network of the map.

The determining of alternate routes between said first position and said second position is based on costs of a first cost type for travelling a respective (alternate) route. The costs of the first cost type may for example be indicated by a (total) cost value for a respective route. The respective costs may for example be obtainable or derivable from cost data, e.g. indicating (single) respective cost values for segments of the route. A single cost value may either be defined explicitly by storing or saving a respective cost value (e.g. as a corresponding entry in a cost table). Alternatively, a cost value may also be derivable, e.g. by further computations, from the cost data. For example, the cost data may also provide a function and a cost value may then be defined by the cost data by deriving the cost value from the cost data by means of the function. While cost values may only be provided for at least a part of the transport network of the map, it is advantageous when cost values are defined for the whole transport network (e.g. all nodes or segments).

The determination of the alternate routes may additionally be based on further costs (i.e. on costs of a further type).

As will be explained in more detail below, the costs of the first cost type may describe different forms of costs, such as a time needed to travel a certain route or segment, or a distance of a certain route or segment.

Further, costs of a second cost type for travelling a respective route are determined for at least one (preferably for each) of said alternate routes, which have been determined. Generally, it may be said that the higher the probability of an unexpected traffic event, the higher the costs of the second cost type. The costs of the second cost type are based on a probability of an unexpected traffic event on the respective alternate route under consideration. The costs of the second cost type do not necessarily need to but may directly represent a probability of an unexpected traffic event on the respective route. The costs of the second type may also be obtained by further computations from such a probability or a value representing such a probability (e.g. by steps such as weighing or combining with further cost values).

As already explained with regard to the costs of the first cost type, also the costs of the second cost type may for example be indicated by a (total) cost value for a respective route. The second cost type may in particular be different from the first cost type. Nevertheless, costs of first cost type may for instance still be used for calculating costs of the second cost type. As already explained with regard to the first cost type, the respective costs may for example be obtainable or derivable from cost data, e.g. indicating (single) respective cost values for segments of the route. A single cost value may either be defined explicitly by storing or saving a respective cost value (e.g. as a corresponding entry in a cost table). Alternatively, a cost value may also be derivable, e.g. by further computations, from the cost data. For example, the cost data may also provide a function and a cost value may then be defined by the cost data by deriving the cost value from the cost data by means of the function. While cost values may only be provided for at least a part of the transport network of the map, it is advantageous when cost values are defined for the whole transport network (e.g. all nodes or segments).

In contrast to a probability of an expected traffic event, such as traffic congestion e.g. predictably caused by commuters in the morning and the afternoon, the second cost type is based on the probability of an unexpected traffic event. In other words, the costs of the second cost type account for traffic events which are not expected in contrast to only accounting for historical traffic patterns (such as expected congestions during commute). Thus, the probability of an unexpected traffic event on a certain route may in particular indicate or be representative of a variance with regard to a respective traffic event on the respective route.

The invention may thus be understood to provide an approach for solving the routing problems mentioned, by providing a stochastic routing engine that proactively estimates the probability of having an unexpected traffic event (such as a traffic congestion surprise ("TCS")) on the route with the lowest costs of the first cost type (e.g. the fastest route). This may allow for providing the user with alternate routes, e.g. with higher ETA confidence. This may present a new user experience for drivers and passengers when in using routing and navigation systems.

This is possible, since routes or segments with a high variance with respect to the event are known or can be determined a-priori. The knowledge about routes or segments with a high variance and thus about the tendencies of these routes or segments to produce a respective unexpected event or surprises can be exploited. In other words, the probability of an unexpected traffic event or the variance with regard to such an event may be used as a routing metric, so that not only a fastest or probably fastest travel time but also a most confident travel time or ETA is provided.

According to an exemplary embodiment of all aspects of the invention, said alternate routes between said first position and said second position comprise a first route and one or more further routes, said further routes being accessible when travelling said first route. For instance, the first route is a route which has been determined as the optimal route (or one of the optimal routes) with regard to costs of the first cost type, i.e. the first route has minimal or the lowest costs of the first cost type. The first route may thus be considered as a preferred route with regard to the costs of the first type. The alternate routes comprise one or more further routes. Preferably, the further routes are not any further routes from the first position to the second position, but the further routes are accessible at some point down the first route and are thus accessible when travelling said first route. The further routes may be less preferred routes with regard to the costs of the first cost type (i.e. have higher costs than the first route). Thus, the further routes preferably branch off from the first route. For instance, the further routes may branch off at different positions (e.g. nodes) from the first route. The first route and the further routes may share a common first section (e.g. a first set of segments or nodes).

According to an exemplary embodiment of all aspects of the invention, said further routes are accessible from said first route in a first section of said first route, said first section being between said first position and a position between said first position and said second position. The further alternate routes may branch off from the first route in a first section of the first route close to the first position (i.e. close to the origin). For instance, and as will be explained further below, the further routes are accessible from the first route (i.e. branch off from the first route) within the first "m" nodes ("m" being an integer smaller than the total count of nodes comprised by the first route).

According to an exemplary embodiment of all aspects of the invention, said first cost type is representative of a time cost.

Accordingly, the costs (e.g. cost values) may indicate a time cost for a respective route. Further possible cost types, which may alternatively or additionally be considered is a distance cost for a respective route, a monetary cost for a respective route or a scenic cost for a respective route.

With regard to a time cost, the cost may be a (minimum, maximum or average) time needed to traverse a corresponding route. The cost may be or comprise a measure for the travel time or journey in seconds, minutes and/or hours or any other suitable time unit. For instance, exemplary costs for a time cost may be "5 m 23 s".

With regard to a distance cost, the cost may be a (minimum, maximum or average) distance to be traveled when traversing a corresponding route. The cost may be or comprise a measure for a length of the route in meters, kilometers, miles or any other suitable distance units. For instance, exemplary costs for a distance cost of a route may be "142.5 km".

With regard to a monetary cost, the cost may be a (minimum, maximum or average) monetary cost to be spent for traversing a corresponding route. The cost may be or comprise a measure for a monetary cost for traversing the route with respect to a certain currency, for example. A monetary cost may take the monetary costs for fuel and/or road tolls into account. For instance, exemplary costs for a monetary cost of a route may be "10.22 €".

With regard to a scenic cost, the cost may be a (minimum, maximum or average) measure for a scenic value for a traveler traversing the route. For instance, a freeway may have a lower scenic cost than a country road. A scenic cost may be or comprise a number indicating the degree of scenic value. For instance, exemplary costs for a scenic cost of a route may be "124".

Additionally, it may be taken into account that certain kinds of roads shall be considered or shall not be considered for determining the route.

According to an exemplary embodiment of all aspects of the invention, said unexpected traffic event on a respective route is a traffic congestion surprise. For instance, the traffic event is in particular not a traffic congestion which is expected from e.g. historic traffic patterns, but a traffic congestion which is unexpected. An unexpected traffic congestion may be caused by an accident, for example, as an accident is one example of a traffic event which is usually not considered with the usual processing of historic traffic patterns. For instance, an unexpected traffic event in the form of a congestion surprise may cause the (minimum, maximum and/or average) speed (with which the route or segment can be traversed) for the respective segment or route to decrease and the time costs to increase. Alternatively, the probability of an unexpected traffic event may also be the probability of another incident, e.g. an accident, the probability of a safety risk, or the probability of dangerous driving.

According to an exemplary embodiment of all aspects of the invention said probability of an unexpected traffic event is determined based on a frequentist probability. The probability of the unexpected traffic event is in this case defined as the limit of its relative frequency in a large number of trials. In one example, unexpected traffic events may be identified in historic traffic data representing historic traffic situations or conditions. From the frequency of unexpected traffic events on a certain route or segment in particular in comparison to unexpected traffic events on other routes the frequentist probability may be derived.

According to an exemplary embodiment of all aspects of the invention, a traffic event is considered an unexpected traffic event in case a traffic condition sufficiently deviates from an expected traffic condition. As an example, a respective unexpected traffic event can be identified in traffic data by comparing an actual traffic condition with the corresponding expectation of the traffic condition (e.g. based on historic traffic data). In case of a sufficient deviation or difference between the actual traffic condition and the expected traffic condition an unexpected traffic event may be assumed. For instance, a traffic condition may be the speed or the time costs for a certain route or segment, i.e. the speed possible or time needed for traversing a respective route or segment. For instance the deviation may be sufficient, if the deviation (e.g. of a parameter such as the costs) is above a (predefined) threshold. For instance, a traffic congestion surprise "TCS" may be assumed in view of the current travel time caused by the real time traffic "RT" and the expected travel time derived from the historic traffic pattern "TP" and a calibration constant "const" for adjusting the threshold with TCS=RT−TP−const, in case TCS is >0.

The identification of unexpected traffic events and their probability may be employed by offline processing, for instance. Thus, the probability for an unexpected traffic event does not need to calculate in real time. For instance, respective cost data may be preprocessed offline. For instance, the data segments or nodes of the transport network of the map may be associated with respective costs not only of the first type but also of the second type.

In this regard and according to an exemplary embodiment of all aspects of the invention, said expected traffic condition is determined based on historical traffic condition data. The historic traffic condition data may in particular relate to the same route or segment which is to be analyzed for an unexpected traffic.

According to an exemplary embodiment of all aspects of the invention, said transport network of said map comprises routing segments. The costs of the first cost type and/or the costs of the second cost type are associated with said route segments of said transport network of said map. As already described earlier, a route of the transport network may comprise routing segments, which may also be termed segments, arcs or links. Additionally or alternatively, and as also described earlier, the transport network of said map may comprise routing nodes or just nodes, which may be connected by respective segments. The segments and/or nodes may be stored in map data of the respective map.

According to an exemplary embodiment of all aspects of the invention, said probability of an unexpected traffic event on a segment of said transport network of said map is based on the frequency of an unexpected traffic event on said segment compared to other segments of said transport network of said map. An unexpected traffic event may be given if the difference between an actual observed condition (for instance, in case of a traffic congestion surprise, the speed on the respective segment is a possible traffic condition to observe) and condition expected based on a historical traffic pattern is larger than a predefined threshold. It can be counted how many times a particular route or segment produces such an unexpected traffic event compared to other routes or segments in the transport network. This can be done over a certain period of time, for instance, e.g. for one day, one week, one month or one year of collected traffic condition data. This approach utilizes the idea, that if a route or segment that has in the past shown a higher frequency of an unexpected traffic event (for instance at a certain time of the day/week/month/year), there is the tendency that an unexpected traffic event happens again (in particular at a similar time of the day/week/month/year).

According to an exemplary embodiment of all aspects of the invention, costs of said first cost type for a respective route are determined by combining costs of said first cost type associated with segments comprised by said respective route. In one example, the costs associated with segments comprised by the respective route are added in order to determine the combined costs of the first cost type. However, it is also possible to multiply the costs of segments comprised by the respective route in order to obtain the combined costs of the first cost type. As a further alternative, it may be possible to determine an average of the costs of the segments in order to determine the combined costs of the second cost type for a respective route.

According to an exemplary embodiment of all aspects of the invention, costs of said second cost type for a respective route are determined by combining costs of said second cost type associated with segments comprised by said respective route. As already described with regard to the costs of the first cost type, the costs associated with segments comprised by the respective route may be added in order to determine the combined costs of the second cost type. It is also possible to multiply the costs of segments comprised by the respective route in order to obtain the combined costs of the second cost type. As a further alternative, it may be possible to determine an average of the costs of the segments in order to determine the combined costs of the second cost type for a respective route.

According to an exemplary embodiment of all aspects of the invention, said combining of costs of said second cost type associated with segments comprised by said respective route comprises weighting said costs of said second cost type. For instance, a weighted sum or weighted product may be used for determining the (overall) costs of the second type for a respective route from the respective segments. For instance, the costs of said second cost type for a segment may be weighted by costs of another cost type (e.g. the first cost type) associated with the respective segment. For instance, the costs of said second cost type may be weighted with travel time associated with the respective segment.

According to an exemplary embodiment of all aspects of the invention, costs of said first cost type and or said second cost type are time-dependent. For instance, the respective costs indicate the costs for a certain time interval (e.g. a time epoch). For instance, the respective costs may depend on the time of the day, week month and/or year. For instance, the respective costs may be a function of time.

According to an exemplary embodiment of all aspects of the invention, said method further comprises:
  providing information based on said determined costs of said second cost type.

For instance, the information may be provided to a user of a personal navigation device (PND), e.g. over a user interface of the personal navigation device. For instance, information based on said determined costs of said second cost type may be a respective cost value. For instance, information based on said determined costs of said second cost type may be a measure for the probability of an unexpected traffic event. For instance, information based on said determined costs of said second cost type may be a measure for the reliability of a provided ETA for the respective route. For instance, information based on said determined costs of said second cost type may be an indication whether it is advisable to use the respective route or not.

According to an exemplary embodiment of all aspects of the invention, said method further comprises:
  selecting one or more routes from said alternate routes at least based on said determined costs of said second cost type.

For instance, the one or more routes with the lowest costs of the second type may be selected. For instance, the one or more routes with a lowest parameter, which is based on the costs of the second cost type, may be selected. In case a single route is selected, this route may for example automatically be used for navigation. In case multiple routes are selected, these routes may then be provided to a user (e.g. over a user interface of a PND) as possible options so that the user can select the preferred route.

According to an exemplary embodiment of all aspects of the invention, alternate routes equal or less than a maximum number are determined. For instance, the number of alternate routes to be determined may be limited to at most K alternate routes, K being an integer >1. For instance, K may be smaller than 20, preferably smaller than 10. For instance, K may be a one digit integer (i.e. 1, 2, 3, 4, 5, 6, 7, 8 or 9). Specifically, because costs of a second cost type (based on a probability of an unexpected traffic event) for travelling the alternate routes is determined, a comparably small number of alternate routes is sufficient, as the reliability of traffic prediction can be increased. Additionally, a limitation to a maximum number of alternate routes saves resources and increases the speed of the method.

According to an exemplary embodiment of all aspects of the invention, said method further comprises:

determining sub-alternate routes for at least one of said alternate routes.

Sub-alternate routes are understood to be alternative paths accessible from a respective determined alternate route. As already explained with regard to the alternate route, similarly, the sub-alternate routes may thus be accessible when travelling the respective alternate route. Thus, the sub-alternate routes preferably branch off from the respective alternate route. For instance, the sub-alternate routes may branch off at different positions (e.g. nodes) from the respective alternate route. The alternate route and the corresponding sub-alternate routes thereof may at least share a common first section (e.g. a first set of segments or nodes). Preferably, sub-alternate routes are determined for each of the determined alternate routes (e.g. each of the K alternate routes). It may be possible to determine all possible sub-alternate routes for a specific alternate route. However, it is not necessary (and not preferred) to determine all possible sub-alternate routes in each case. Thus, for instance, the determining of sub-alternate routes may be limited in order to prevent a determination of an excessive number of sub-alternate routes for a respective alternate route.

According to an exemplary embodiment of all aspects of the invention, said costs of said second cost type for an alternate route are costs of said second type for said alternate route or for a determined sub-alternate route for said alternate route. In case sub-alternate routes are determined for a respective alternate route, there are generally multiple options for determining e.g. the respective costs of the second cost type, as there is not only the alternate route but potentially also the respective sub-alternate routes of this alternate route. In that case it may be preferred to determine the costs of the second cost type for a respective alternate route based on the costs of the second cost type of one of the determined sub-alternate routes (e.g. to use or define the costs of the second cost type of one of the determined sub-alternate routes as the costs of the second cost type for a respective alternate route). In one example, the costs of the second cost type for an alternate route are the costs determined for the alternate route, which has the lowest costs, so that the lowest costs of the second type possible are chosen.

According to an exemplary embodiment of all aspects of the invention, said method further comprises:

determining the number of sub-alternate routes for at least one of said determined alternate routes.

Preferably, the number of sub-alternate routes for each of the determined alternate routes is determined. If the number or count of sub-alternate routes is considered, this information can be used e.g. for the selection of an optimal route form the determined alternate routes. This information is helpful, because even an alternate route having a high probability of an unexpected traffic event (and thus high costs of the second cost type) may nevertheless be the preferred or one of the preferred alternate routes, in case there are many sub-alternate routes around/along the alternate route (which may in the best case additionally have a low probability of an unexpected traffic event). Likewise, an alternate route having a low probability of an unexpected traffic event may nevertheless be a not or less preferred alternate route, in case there are no sub-alternate routes or all or most of the sub-alternate routes have a high probability of an unexpected traffic event.

Thus, according to an exemplary embodiment of all aspects of the invention, said selecting of one or more routes from said alternate routes is also based on the determined number of sub-alternate routes. In one example, the costs of the second cost type are also based on the determined number of sub-alternate routes. The selecting of one or more routes from said alternate routes may then be based on the costs of the second type. In another example, a separate parameter is determined which may at least be based on the costs of the second cost type and the determined number of sub-alternate routes. The selecting of one or more routes from said alternate routes may then be based on this parameter.

According to an exemplary embodiment of all aspects of the invention, a route from said alternate routes is selected based on a parameter, said parameter being based on one or more of said determined costs of said first cost type for said alternate routes;
    said determined costs of said second cost type for said alternate routes; and/or
    said number of sub-alternate routes for respective alternate routes.

For instance, the different factors for a respective alternate route (costs of the first/second type, number of sub-alternate routes) may be inverted and/or normalized (e.g. with respect to the respective factors of the other determined alternate routes). For instance, the parameter may be obtained by a combination (e.g. a summation) of the different factors (e.g. after normalization). As an example, assuming that the parameter shall depend on a time cost JT (as an example of a first cost type), on a probability of a traffic congestion surprise PTCS (as an example of a second cost type) and the number of sub-alternate routes for a specific alternate route COUNT, then the parameter may for example be determined by $1/JT$ divided by $\max(1/JT)+1/PTCS$ divided by $\max(1/PCTS)+COUNT$.

Generally, the parameter could be a sum of any combination of these factors or other criteria. Further, the parameter could also be determined with weighted sum, for example, where one factor is weighted higher than the other but all are considered.

According to an exemplary embodiment of all aspects of the invention, a route from said alternate routes is selected for which said parameter is maximal or minimal. Depending on the definition of the parameter, a maximized or minimized parameter is preferred for the selection of the route.

According to an exemplary embodiment of all aspects of the invention, said determining of said sub-alternate routes is based on an uninformed search algorithm. An uninformed search algorithm may be a search algorithm which is not employing a heuristic approach. An example of an uninformed search algorithm is the depth first search algorithm, as will be explained in more detail below.

According to an exemplary embodiment of all aspects of the invention, said determining of said sub-alternate routes comprises obtaining a tree structure for a respective alternate route, said tree structure comprising nodes of said transport network of said map. For instance, a tree structure may be obtained for each determined alternate route. Alternatively, a common tree structure may be obtained for the alternate routes. The tree structure may be precomputed or determined if needed. The tree structure may comprise a root node or origin node, which may be a node on one of the alternate routes (e.g. on the first alternate route, e.g. between the first position and the second position, e.g. one of the first "m" nodes). The branches of the tree structure may thus correspond to the segments of the transport network of the map.

According to an exemplary embodiment of all aspects of the invention, said determining of sub-alternate routes comprises employing a depth-first search algorithm. A depth-first search algorithm is in particular understood to be an algorithm for traversing or searching tree structure (e.g. the determined tree structure described above), starting at the root and exploring as far as possible along each branch before backtracking.

According to an exemplary embodiment of all aspects of the invention, said tree structure for each node comprises child nodes equal or less than a maximum number. For instance each node may at most have said maximum number of child nodes. For instance, the maximum number may be "K", with "K" being an integer >1. For instance, "K" may be smaller than 20, preferably smaller than 10. For instance, "K" may be a one digit integer (i.e. 1, 2, 3, 4, 5, 6, 7, 8 or 9). Thus, the tree structure may have at most K branches or edges (corresponding to or representing segments of the transport network of the map) for each node.

The tree structure may thus be termed a K-route tree (KRT). The approach implementing a depth-first search with a maximum of K edges may be termed a K-modified depth-first search (DFS).

While the maximum number of child nodes may generally be different from the maximum number of alternate routes, the maximum number of child nodes is preferably identical to the maximum number of alternate routes. This is reasonable as only K alternate routes are determined and hence when a user finally traverses to a position corresponding to a respective node en-route, again only K alternate routes would be of interest.

According to an exemplary embodiment of all aspects of the invention, child nodes to be considered for a certain node of the tree structure are chosen based on a cost from said certain node to said child nodes. In case the transport network of the map would generally allow more than the maximum number of child nodes, certain child nodes need to be chosen from potentially available child nodes to be considered or included in the tree structure. When the child nodes are chosen based on a cost (e.g. a cost of the first cost type or second cost type) potentially preferred sub-alternate routes are chosen, e.g. routes with nodes/branches producing the lowest cost are considered first.

According to an exemplary embodiment of all aspects of the invention, said determining of said number of sub-alternate routes is based on a leaf count of said tree structure. The leafs of the tree structure are understood to be the nodes of the tree structure with no children. Each leaf of the tree structure represents a possible sub-alternate route to the second position or destination. Thus, the leaf count of the tree structure can advantageously be used for determining the number of sub-alternate routes.

According to an exemplary embodiment of all aspects of the invention, branches of said tree structure are associated with respective costs of said first cost type and/or of said second cost type for travelling a path represented by said branch. For instance, each branch is associated with a (weighted) cost of the first/second cost type. Therein, the cost of the second type may be weighted e.g. with the cost of the first cost type such as the travel time.

Additionally or alternatively, and according to an exemplary embodiment of all aspects of the invention, nodes of said tree structure are associated with respective costs of said first cost type and/or said second cost type for travelling from a position represented by a root of said tree structure to a position represented by said node. For instance, each node of said tree structure is associated with respective costs of said first cost type and/or said second cost type. Again, each node is associated with a (weighted) cost of the first/second cost type, e.g. the cost of the second type may be weighted e.g. with the cost of the first cost type such as the travel time.

According to an exemplary embodiment of all aspects of the invention, at least said determining or triggering determining of alternate routes between said first position and said second position at least based on costs of a first cost type for travelling a respective route and/or said determining or triggering determining of costs of a second cost type for travelling a respective route for at least one of said alternate routes is repeated. The actions may be repeated while a user is travelling from said first position to said second position. For instance, the actions may be repeated automatically. For instance, the actions may be repeated after a predetermined time interval, e.g. every x seconds or minutes. Therein, as the user may travel along one of the alternate routes, the first position may change over time. The actions are then repeated with an updated first position. Of course, in this embodiment also the other actions described herein may be repeated.

According to an exemplary embodiment of all aspects of the invention, said determining of said alternate routes is based on an informed search algorithm and/or a best-first search algorithm, in particular an A* algorithm. An informed search algorithm may in particular employ a heuristic approach.

In short, the A* algorithm, at each iteration, determines which segment of the travel network to expand into one or more longer segments. This is done based on an estimate of the respective cost still to go to the destination node (second position). Specifically, the A* algorithm selects the path that minimizes a cost function such as $f(n)=g(n)+h(n)$, where n is the last node on the path, $g(n)$ is the cost of the path from the first origin node (first position) to n, and $h(n)$ is a heuristic that estimates the cost of the cheapest path from n to the destination node. In a typical implementation of the A* algorithm, a priority queue is employed to perform the repeated selection nodes to expand with minimum (estimated) costs. This priority queue may also be termed the "open set". At each step of the algorithm, the node with the lowest $f(x)$ value is removed from the queue, the f and g values of its neighbors are updated accordingly, and these neighbors are added to the queue.

According to an exemplary embodiment of all aspects of the invention, said determining of said alternate routes comprises employing an A* algorithm implementing a priority queue, said algorithm comprises modifying said priority queue by removing nodes from the priority queue. This can improve the performance of the algorithm, as there may be a large number of alternate routes for a specific route. By reducing the priority queue, the number of alternate routes to be determined can be reduced to the alternate routes of most interest, as will be explained in more detail below.

According to an exemplary embodiment of all aspects of the invention, said determining of said alternate routes comprises employing an A* algorithm implementing a priority queue comprising nodes of said transport network of said map, said algorithm comprising:

determining a first route between said first position and said second position by minimizing costs of said first cost type by running said A* algorithm;

modifying said priority queue by retaining nodes from said priority queue with a depth on the path from said first position to said second position below a predefined threshold and/or by removing nodes from said priority queue belonging to paths comprising parent nodes on the path from said first position to said second position above a predefined threshold;

determining a further route between said first position and said second position by minimizing costs of said first cost type by running said A* algorithm based on said modified priority queue;

optionally repeating said modifying of said priority queue and said determining of a further route based on said modified priority queue until a desired number of alternate routes is obtained.

The first route determined may in particular be a most preferred route (e.g. with the minimal or lowest costs of the first cost type). Since this modified A* algorithm modifies the priority queue by retaining and/or removing specific nodes in the priority queue, only the alternate routes close to the origin node are considered, as already described. As also described, preferably (at most) a number K of alternate routes may be determined, while the first cost may be a time cost. Thus, the described approach may be termed the K fastest alternate routes (KFAR).

Irrespective of the approach used, the alternate routes may be determined based on a current traffic condition (i.e. a traffic condition at the time the method is performed).

According to an exemplary embodiment of all aspects of the invention, said predefined threshold is an integer smaller than a number of nodes comprised by said first route from said first position to said second position. The threshold may in particular be the integer "m" already described. Thus, the further alternate routes are accessible from the first route (i.e. branch off from the first route) within the first "m" nodes with "m" being an integer smaller than the total count of nodes comprised by the first route.

According to an exemplary embodiment of all aspects of the invention, said at least one apparatus comprises:

a mobile device;

personal navigation device; and/or a server.

Since the advantages of the method are in particular a potential for running fast with little resources (computing power), the method may in particular be performed by a mobile device or (portable) personal navigation device (e.g. a GNSS-enabled smartphone and/or a navigation device of a vehicle). However, it may also be the case that some or all actions are performed by a remote server e.g. in communication with a mobile device or personal navigation device.

The features and example embodiments of the invention described above may equally pertain to the different aspects according to the present invention.

It is to be understood that the presentation of embodiments of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 5 is a table illustrating the output of an exemplary method;

FIG. 6 is a table illustrating the exemplary determination of a parameter based on costs and sub-alternate route count.

DETAILED DESCRIPTION OF THE FIGURES

Figure 1:
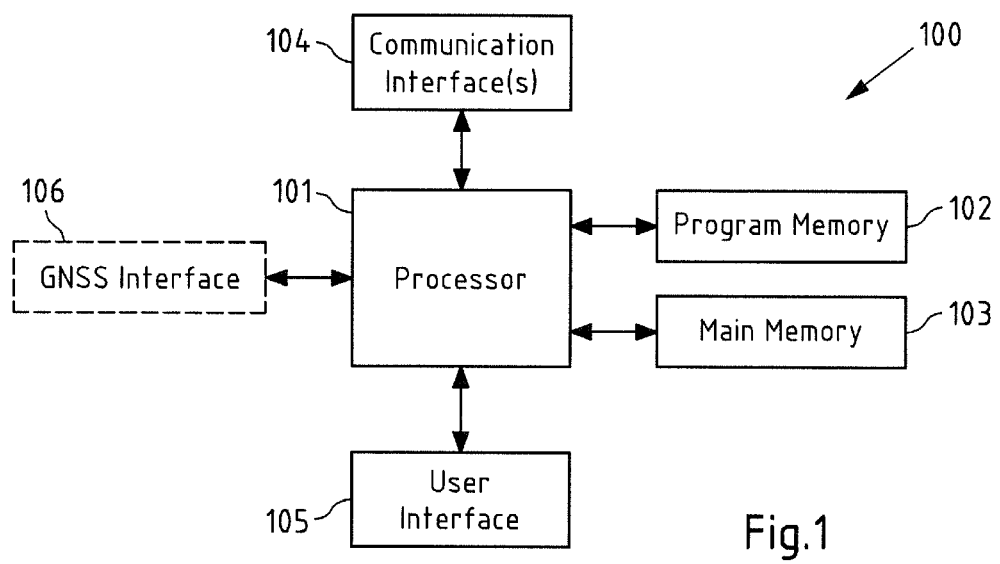
FIG. 1 is a block diagram of an exemplary embodiment of an apparatus according to the exemplary aspects of the invention.

FIG. 1 is a block diagram of an exemplary embodiment of an apparatus 100, e.g. a personal navigation device or a server according to the exemplary aspects of the invention. For instance, the apparatus 100 is or forms a part (e.g. as a module) of a GNSS-enabled smartphone or a navigation device of a vehicle.

Apparatus 100 comprises a processor 101. Processor 101 may represent a single processor or two or more processors, which are for instance at least partially coupled, for instance via a bus. Processor 101 executes a program code stored in program memory 102 (for instance program code causing apparatus 100 to perform exemplary embodiments of the method (or parts thereof) according to the exemplary aspects of the invention, when executed on processor 101), and interfaces with a main memory 103. Some or all of memories 102 and 103 may also be included into processor 101. One of or both of memories 102 and 103 may be fixedly connected to processor 101 or at least partially removable from processor 101, for instance in the form of a memory card or stick. Program memory 102 may for instance be a non-volatile memory. In program memory 102, a navigation data, such as map data and/or cost data may be stored. Program memory 102 may also comprise an operating system for processor 101. Program memory 102 may for instance comprise a first memory portion that is fixedly installed in apparatus 100, and a second memory portion that is removable from apparatus 100, for instance in the form of a removable SD memory card. Main memory 103 may for instance be a volatile memory. It may for instance be used as a working memory for processor 101 when executing an operating system and/or programs.

Processor 101 further controls a communication interface 104 configured to receive and/or output data and/or information. For instance, in communication interface 104 may be configured to communicate with another apparatus. The communication may for instance be based on a wireless communication connection. The communication interface 104 may thus comprise circuitry such as modulators, filters, mixers, switches and/or one or more antennas to allow transmission and/or reception of signals. In embodiments of the invention, communication interface 104 is inter alia configured to allow communication according to a 2G/3G/4G/5G cellular communication system and/or a non-cellular communication system, such as for instance a WLAN network. Nevertheless, the communication connection between different apparatuses (e.g. a server and a personal navigation device) may equally well at least partially comprise wirebound portions.

Processor 101 further controls a user interface 105 configured to present information to a user of the apparatus 100 and/or to receive information from such a user. User interface 105 may for instance be the standard user interface via which a user of navigation device 100 controls other functionality thereof, such as finding/searching a destination position, entering a routing request, providing a cost preference etc. An example for such a user interface is a touch sensitive display.

Processor 101 may further control an optional GNSS interface 106 configured to receive positioning information of an GNSS such as Global Positioning System (GPS), Galileo, Global Navigation Satellite System (i.e. "Globalnaja Nawigazionnaja Sputnikowaja Sistema", GLONASS) and Quasi-Zenith Satellite System (QZSS).

The components 102-106 of apparatus 100 may for instance be connected with processor 101 by means of one or more serial and/or parallel busses.

Figure 2:
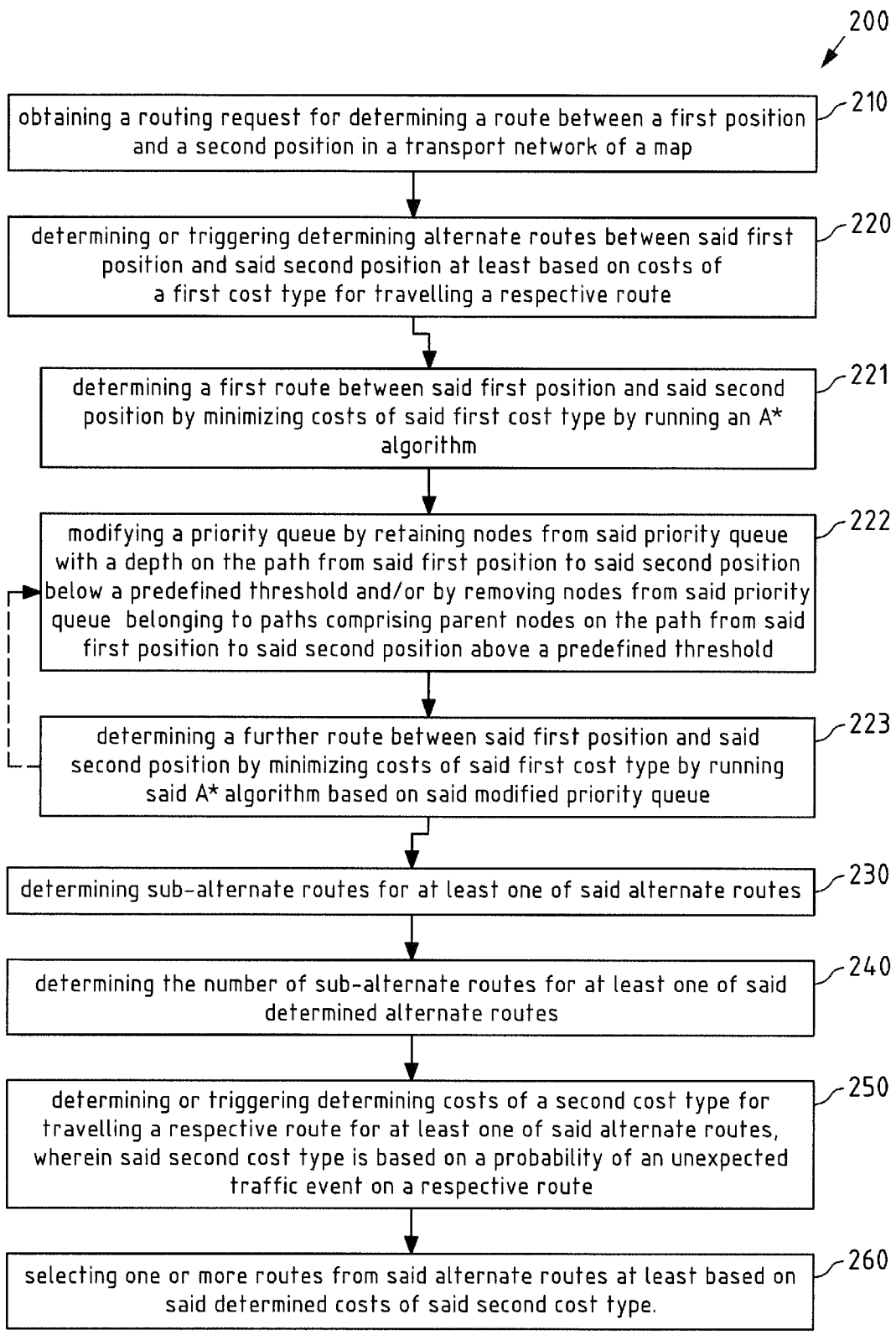
FIG. 2 is a flowchart of an exemplary embodiment of a method according to the exemplary aspects of the invention.

FIG. 2 is a flowchart 200 of an exemplary embodiment of a method according to the exemplary aspects of the invention. The exemplary method will be explained in connection with FIGS. 3-6.

An apparatus (e.g. apparatus 100, such as a server, smartphone or personal navigation device) obtains a routing request for determining a route between a first position and a second position in a transport network of a map (action 210). An example of a transport network 300 is shown in FIG. 3a, with examples of different first positions (origins "O1", "O2") and a second position (destination "D"). The transport network comprises nodes n1-n11 and segments, arcs or links connecting respective nodes between the nodes "O1", "O2" and "D".

The apparatus may determine or trigger a determination of alternate routes between said first position and said second position at least based on costs of a first cost type for travelling a respective route (action 220). This determination comprises actions 221-223, which will be explained in the following with the costs of the first cost type being a time cost (e.g. travel time TT or journey time JT). However, the described example is likewise applicable to other costs.

In actions 220-223 the K fastest routes for the user over the entire network starting from an origin "O" to a destination "D" is determined by using a modified A* algorithm with the current traffic condition (e.g. time t=0). The K modified A* algorithm for finding the K fastest alternate routes (KFAR) is explained in the following, First, it should be noted that the KFAR algorithm may sound similar to the K-shortest paths (KSP) or the K-fastest routes (KFR) algorithm but it is not the same. The KFR is basically the same as KSP, the only difference being that the cost for a certain segment or arc is travel-time (TT) in case of the KFR algorithm and distance in case of the KSP algorithm. In contrast, the KFAR algorithm is exploring how many viable alternate routes ("close to the origin") a user can take en-route from origin "O" to destination "D". As the KFAR algorithm will be run several times en-route, the faster alternate routes closer to the first position or origin (e.g. a driver's position) is more important than faster alternate routes much later (i.e. downstream) on the route.

As will be explained, the KFAR algorithm is achieved by modifying the priority queue inside the A* algorithm K times in order to generate the K fastest alternate routes.

First, the (usual) A* algorithm produces the first fastest route reaching the destination node "D" and starting from origin node "O". Thus, a first route between said first position and said second position by minimizing costs of said first cost type is determined by running an A* algorithm (action 221).

Then a small integer number "m" of nodes from "O" to "m" in the depth of the path from "O" to "D" is retained and all nodes in the priority-queue belonging to a path with any parent node in the set of nodes from "m" to "D" is deleted from the A* priority queue. In other words, the priority queue is modified by retaining nodes from the priority queue with a depth on the path from said first position ("O") to the second position ("D") below a predefined threshold ("m") and by removing nodes from the priority queue belonging to paths comprising parent nodes on the path from the first position ("O") to the second position ("D") above a predefined threshold ("m") (action 222). This will result in the next node to be output from the algorithm having parent nodes only within the set "O" to "m". Thus, a further route between the first position ("O") and the second position ("D") is determined by minimizing costs of said first cost type (time) by running said A* algorithm based on said modified priority queue (action 223).

The A* algorithm can then be run again, and the next fastest route found will be a further alternate route earlier on the route again having a parent node within the set "O" to "m". This can be repeated K times and the K fastest alternate routes are obtained.

It is noted that e.g. the KSP algorithm is based on the Dijkstra's algorithm, while in contrast the presented KFAR algorithm is based on the A* algorithm for path finding, which is an heuristic and faster version of the Dijkstra algorithm. This makes the presented KFAR algorithm computationally tractable and fast, as the many nodes deleted from the priority queue speeds up the route search but still ensures that the appropriate or desired alternate routes are obtained.

It will now be explained, how sub-alternate routes for the above K alternate routes are determined (action 230), how the number of sub-alternate routes for at least one of the determined alternate routes is determined (action 240) and how the costs of a second cost type for travelling a respective route for at least one of the alternate routes are determined, wherein the second cost type is based on a probability of an unexpected traffic event on a respective route, here the PCTS costs (action 250). While in the following example, the unexpected traffic event is a traffic congestion surprise (TCS), the described example is likewise applicable to other unexpected traffic events.

While above KFAR algorithm focused on how fast the alternate routes are (by considering the time cost), which is typically the focus of today's navigation systems (assuming that the fastest route is the optimal choice), experience has shown that this does not always result in the most reliable and congestion free route. Therefore, actions 230-250 now focus on the alternate route with the lowest chances of having a (negative) unexpected traffic event, i.e. a traffic congestion surprise (TCS).

For this, it shall first be explained how an unexpected traffic event can be identified. An unexpected traffic event takes place, when the traffic condition suddenly changes on a route segment to an unexpected traffic condition, which is typically significantly slower traffic speed or high traffic congestion (which is referred to as negative surprise). However, this approach is not limited to a negative surprise and it is also possible to determine e.g. a higher traffic speed or generally a positive surprise in the same way.

The probability of an unexpected traffic event on a segment can be obtained a-priori using historical data, so that a PTCS value or segment cost can be obtained.

A traffic congestions surprise (TCS) can be defined as the difference in the current real-time travel time (RT) and the expected traffic pattern travel time (TP) derived from the historical data. Mathematically, a TCS event takes place if TCS>0 with TCS=RT−TP−const. All units are travel time (e.g. seconds). The term "const" is a calibration constant that defines how significant the difference between the actual traffic condition and the expected traffic condition has to be in order to assume an unexpected traffic event. It should be noted that a TCS is only assumed or counted when TCS>0 in order to only identify a TCS event when the current real-time travel time got (much) worse than the expected traffic pattern travel time leading to congestion.

Now, the probability of a TCS event (PTCS) for a specific segment or link is the chance that a TCS event occurs. This information can be obtained by the frequentist probability approach, which says that if a segment or link has in the past shown a higher frequency of a TCS event at a time t, it has the tendency to do it again at similar time of the day/week/month/year. For this, historical data can be used and it is counted how many times a particular segment or link produces a TCS event compared to other links in the network. This process can be done over a certain period of time, e.g. one month of collected real time traffic data. As a result for the time t the probability of a TCS event PTCS(t) is obtained.

By means of offline processing the expected traffic pattern travel time TP and the probability of a TCS event PTCS are generated and associated with the segments or links of the transport network for various times t.

Returning now to the question of how to determine which of the K alternate routes generated by the above KFAR algorithm has the lowest PTCS. In short, this is achieved by employing tree structures termed "K-route trees" (KRT) for the transport network and (at least) populate it with the probability of having a traffic congestion surprise (TCS) event.

Considering first, that the number of possible routes in a transport network can be very huge, a K-value is used to limit the breadth of the search for the sub-alternate routes, such that when K=2, for example, each node on the tree structure can only have a maximum of 2 children (i.e. 2 alternatives). The tree structure can be built by running a modified depth-first search (DFS) algorithm for the K alternate routes returned by the modified A* search algorithm (actions 220-223) described above.

The K-modified depth-first search (DFS) algorithm searches all sub-alternate routes from an origin node between "O" and "m" and the goal node "D". Therein DFS search process also includes a weighted multiplication of the PTCS and TT and the costs for each segment is computed along with the DFS search.

In more detail, generating the KRT is achieved by employing a modified DFS algorithm. The DFS algorithm is modified insofar as the K nodes to explore are chosen as a function the costs from the current node to the respective node to be explored (preferring lower costs). Hence, the DFS algorithm will explore in the order of the segment costs up to a maximum of K branches or edges of the tree structure from the current node. This is designed such that the sub-alternate routes explored from every node is always equal or less than K, hence making the search very lightweight and fast. This is reasonable as the original use-case is to explore only K alternate routes. Hence, when the user finally traverses to these nodes en-route, only the top K alternate routes would matter. The smaller the K value the faster the method.

Figure 3:
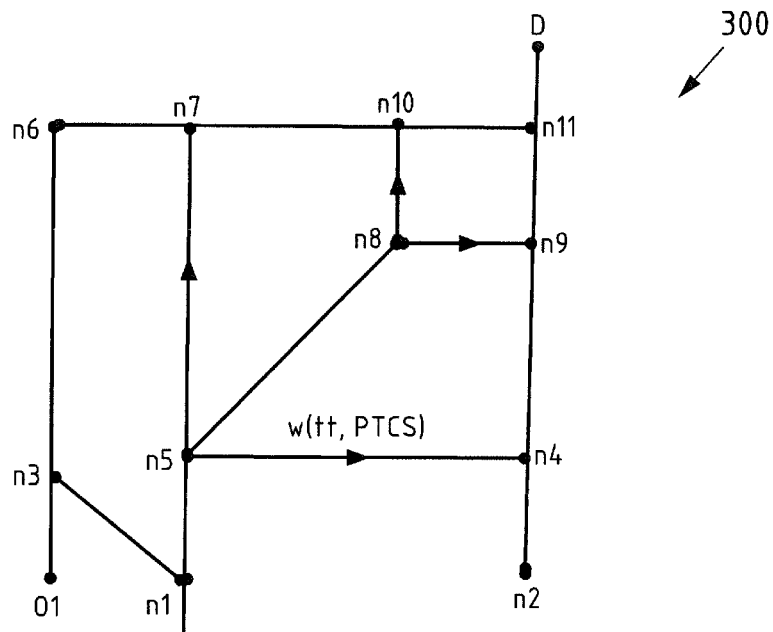
FIG. 3 is a schematic illustration of an exemplary transport network.

FIG. 3 shows an exemplary sample network graph 300 (directed network) with nodes n1 to n11. The segments are associated with respective costs of the first cost type (TT) and costs of the second cost type (PCTS), as illustrated between node n5 and n4.

Figure 4A:
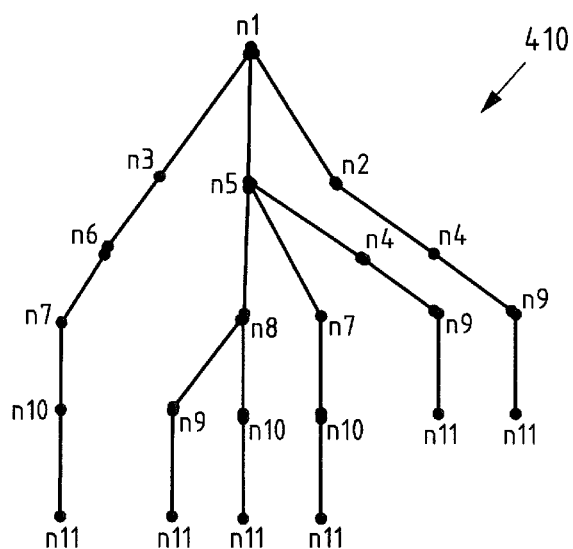
FIG. 4a-c are schematic illustrations of exemplary tree structures.

FIG. 4a illustrates an exemplary tree structure 410 (KRT) for K=3 illustrating the determined sub-alternate routes between "O2" and "D" of the transport network shown in FIG. 3.

As shown, the DFS algorithm explores all possible (sub-) alternate routes from node n1 to n11. Therein, the leafs of the KRT contains the weighted/computed PTCS cost for that respective path from the root to the leaf (which computation will be explained in more detail below). Hence, the minimum costs on all the leaf nodes of the K alternate routes from n1 (which are nodes n3, n5 and n2) are obtained to represent the reliability cost or how safe it is to take the route and be sure that TCS is less likely. While the PTCS costs for the route via node n2 and n3 is the weighted PTCS cost associated with the (single) respective leaf node, the PTCS costs for the route over node n5 is the minimum weighted PTCS cost associated with the respective 4 leaf nodes.

The (total) PTCS costs for a route from the root to a respective leaf can be calculated by considering the (individual) ptcs costs for single segments. The PTCS cost is the total weighted sum of ptcs costs for the different segments of the route weighted by the travel-time tt for the respective segment. Mathematically, this can be expressed as follows:

$$PTCS_k(leaf1) = \sum_{j=k}^{leaf1} tt_{ij} \cdot ptcs_{ij} \; \forall \; i = \text{current } DFS \text{ position}$$

$$PTCS_k(leaf2) = \sum_{j=k}^{leaf2} tt_{ij} \cdot ptcs_{ij} \; \forall \; i = \text{current } DFS \text{ position}$$

$$\vdots$$

$$PTCS_k(leaf_n) = \sum_{j=k}^{leaf_n} tt_{ij} \cdot ptcs_{ij} \; \begin{array}{l} \forall \; i = \text{current } DFS \text{ position \&} \\ n = \text{total leaf nodes} \end{array}$$

$$PTCS_k = \min_{L=1,\ldots,n} \{PTCS_k(leaf_L)\}$$

It is noted that the values in these equations are a function of the time or time epoch t of the day, week, month or year, so that the ptcs values contain various ptcs(t) values for different time epochs t. Hence, a more time-dependent general equation for the PTCS computation is:

$$PTCS_k(leaf1, t) = \sum_{j=k}^{leaf1} tt_{ij}(t) \cdot ptcs_{ij}(t)$$

∀ i = current DFS position at time epocht

An alternative to using a summation as explained above is to use a product and multiply the (weighted) pcts costs of the individual segments over the route and modelling the network as a Bayesian network. This would be another realistic way of modeling the network and obtain the relative PTCS for each route.

Figure 4B:
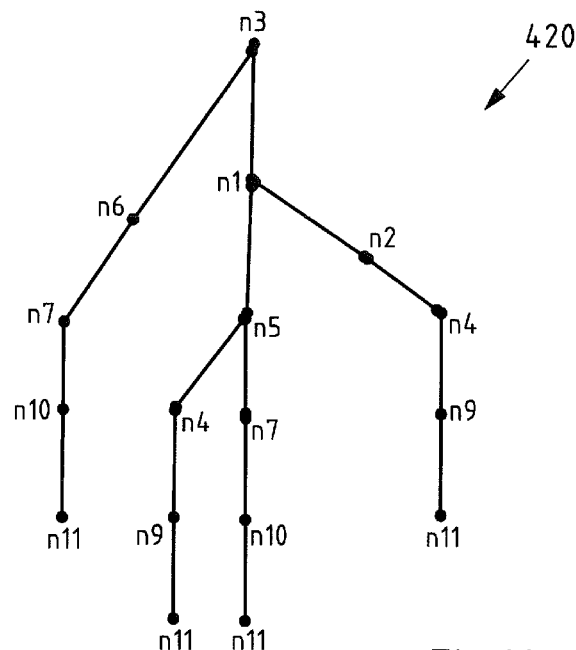
Figure 4C:
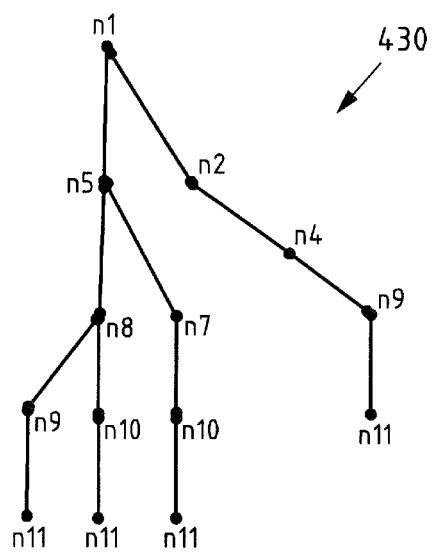

As further examples of K-route trees, FIGS. 4b, 4c illustrate the tree structure 420, 430 of KRTs for K=2 between "O1" and "D" (FIG. 4b) and "O2" and "D" (FIG. 4c) using the network graph of FIG. 3.

Compared to the tree structure of FIG. 4a, some branches have been removed. This is due to the chosen constraint of K=2 leading to an even more lightweight tree data structure for generating possible sub-alternate routes for the entire journey. Generally, the value of K can be preconfigured by a provider of navigation services or by the user (e.g. by means of certain preferences).

Additionally, it is noted that the number or count of leaf nodes for each branching alternate route is also considered. Turning again to FIG. 4a, the number of leafs under node n3 equals 1, under node n2 equals 1 and under node n5 equals 4. Hence, it may be the case that even though the route via node n5 may not have the lowest PTCS, it may still be an attractive route to take, since there are many sub-alternate routes to the same destination "D" en-route, so that the user still has alternatives in case a TCS event happens. In other words, even if the fastest route has a high PTCS, as there may be many low PTCS sub-alternate routes around/along the route, it may still be a preferred route. In a similar way, if another route has a low PTCS but most of the alternative routes around it have a high PTCS, then it is not necessarily a preferred route.

The modified DFS algorithm employing the K-route trees described above can generate the PTCS cost as a <float> and the alternate route count as an <integer> for every K alternate routes at a particular origin node (e.g. node n1). Thus, the output is exemplarily illustrated in the table 500 of FIG. 5.

While the journey time (costs of the first cost type) is already a result of the KFAR algorithm, the PTCS cost and the alternate route count (total leaf count) are a result of the modified DFS algorithm.

Based on the output illustrated in FIG. 5, one or more (or all) routes from the K alternate routes can be selected at least based on the determined costs of said second cost type, i.e. the PCTS costs (action 260) and displayed to the user or directly used for navigation. As an example, the K routes obtained may be output to the user or a single route with the lowest cost can be selected by default.

In one example, a route is selected by sorting the results based on the journey time in which the route with the shortest journey time becomes the selected route. In one example, a route is selected with the most assurance of a safe travel-time with a low likelihood of meeting a TCS event en-route. This can be achieved by selecting the route with the smallest PTCS value. In one example, a route is selected which has the most sub-alternate routes the user can take en-route. For this, the route with the highest number of leaf nodes is selected. It is also possible to output some or all of the routes to the user based on a respective ordering.

In many cases, the different sorting approaches will produce a similar ordering. In one example, a notification may be output to the user to choose a route whenever there is a dissimilarity in the ordering resulting from a sorting based on the journey time and the PTCS. For instance, two possible routes (the best from each sorting) may be output to the user (e.g. together with corresponding ETA values).

In another example, a selection or ordering may be based on a combination of any two or all of the three criteria by doing a summation of the values after normalizing them. This can be achieved as illustrated in the table 600 of FIG. 6. In this example, a parameter, the normalized total costs (TC), are defined as TC=[1/JT/max(1/JT)]+[1/PTCS/max(1/PTCS)]+[leaf_count/max(leaf_count)].

In this case, the alternate route with maximum TC is selected as the preferred route. It noted that the parameter could also be a sum of any of the combined 2 or 3 or other routing criteria and it could also be a weighted sum where a parameter is weighted higher than the other but all are factored in.

Some or all of the above actions may be repeated e.g. every x seconds or minutes en-route. In case the current traffic condition has changed (TT, costs of the first cost type), the table of FIG. 5 or 6 would be updated with the K alternate routes with corresponding costs and alternate route count. For instance, if a route with lower costs than before is found en-route, a re-routing alert can be output and the user may choose whether a re-routing shall be done.

Figure 7:
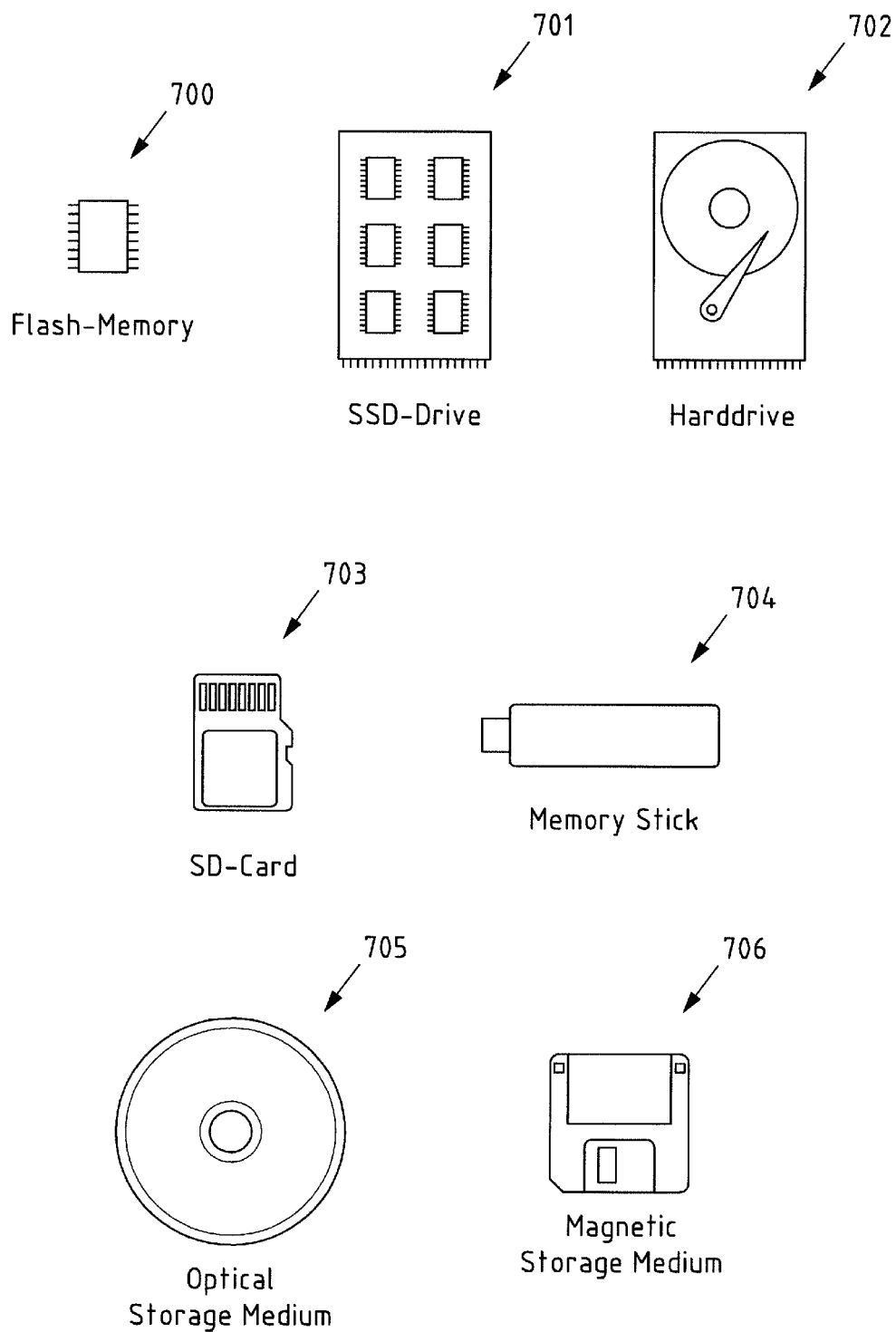
FIG. 7 is a schematic illustration of examples of tangible storage media according to the present invention.

FIG. 7 is a schematic illustration of examples of tangible computer-readable storage media according to the present invention that may for instance be used to implement program memory 102 of FIG. 1. To this end, FIG. 7 displays a flash memory 700, which may for instance be soldered or bonded to a printed circuit board, a solid-state drive 701 comprising a plurality of memory chips (e.g. Flash memory chips), a magnetic hard drive 702, a Secure Digital (SD) card 703, a Universal Serial Bus (USB) memory stick 704, an optical storage medium 705 (such as for instance a CD-ROM or DVD) and a magnetic storage medium 706.

The described approach improves online traffic-aware routing in which the traffic condition may change en-route during the journey and slackens the greedy nature of algorithms like the A* algorithm to find a more optimal route that is based on envisaged possible changes in traffic conditions en-route for that time of the day. The PTCS computation is exploited to predict these possible changes in traffic condition before the user or device makes a route choice, and determines the better and safer and yet fast enough route for the user. This presents various user experience opportunities for navigation applications and devices that will give users more options and more confidence when travelling, knowing that the approach will keep finding the best alternate routes using up to date traffic information.

In summary the described approach brings the following new capabilities to routing and navigation devices:
  The ability to consider the cost function PTCS as a cost in an optimal route search
  The ability to use TCS and other cost functions (like TT) in same algorithm (i.e. it is robust).

It solves the fundamental online routing problem that not only considers segment costs at time t=0 but at future time t>0 by factoring possible alternate routes instead of future prediction segment costs only.

A user experience is presented that allows users to trade-off faster routes for a higher probability of the fastest and/or safest route.

A heuristics that speeds up the A* search for alternate routes using KRT.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
 (a) hardware-only circuit implementations (such as implementations in only analog and/or digital circuitry)
 (b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions and
 (c) to circuits, such as a microprocessor(s) or a portion of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processor 100 of FIG. 1, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The following embodiments are also disclosed:
1) A method performed by at least one apparatus, the method comprising:
 obtaining a routing request for determining a route between a first position and a second position in a transport network of a map;
 determining or triggering determining alternate routes between said first position and said second position at least based on costs of a first cost type for travelling a respective route; and
 determining or triggering determining costs of a second cost type for travelling a respective route for at least one of said alternate routes, wherein said second cost type is based on a probability of an unexpected traffic event on a respective route.
2) The method according to embodiment 1, wherein said alternate routes between said first position and said second position comprise a first route and one or more further routes, said further routes being accessible when travelling said first route.
3) The method according to embodiment 2, wherein said further routes are accessible from said first route in a first section of said first route, said first section being between said first position and a position between said first position and said second position.
4) The method according to any of the preceding embodiments, wherein said first cost type is representative of a time cost.
5) The method according to any of the preceding embodiments, wherein said unexpected traffic event on a respective route is a traffic congestion surprise.
6) The method according to any of the preceding embodiments, wherein said probability of an unexpected traffic event is determined based on a frequentist probability.
7) The method according to any of the preceding embodiments, wherein a traffic event is considered an unexpected traffic event in case a traffic condition sufficiently deviates from an expected traffic condition.
8) The method according to any of the preceding embodiments, wherein said expected traffic condition is determined based on historical traffic condition data.
9) The method according to any of the preceding embodiments, wherein said transport network of said map comprises routing segments and wherein costs of the first cost type and/or costs of the second cost type are associated with said route segments of said transport network of said map.
10) The method according to embodiment 9, wherein said probability of an unexpected traffic event on a segment of said transport network of said is based on the frequency of an unexpected traffic event on said segment compared to other segments of said transport network of said map.
11) The method according to embodiment 9 or 10, wherein costs of said first cost type for a respective route are determined by combining costs of said first cost type associated with segments comprised by said respective route.
12) The method according to any of the embodiments 9-11, wherein costs of said second cost type for a respective route are determined by combining costs of said second cost type associated with segments comprised by said respective route.
13) The method according to any of the embodiments 9-12, wherein said combining of costs of said second cost type associated with segments comprised by said respective route comprises weighting said costs of said second cost type.

14) The method according to any of the preceding embodiments, wherein costs of said first cost type and or said second cost type are time-dependent.
15) The method according to any of the preceding embodiments, said method further comprising:
providing information based on said determined costs of said second cost type.
16) The method according to any of the preceding embodiments, said method further comprising:
selecting one or more routes from said alternate routes at least based on said determined costs of said second cost type.
17) The method according to any of the preceding embodiments, wherein alternate routes equal or less than a maximum number are determined.
18) The method according to any of the preceding embodiments, said method further comprising:
determining sub-alternate routes for at least one of said alternate routes.
19) The method according to embodiment 18, wherein said costs of said second cost type for an alternate route are costs of said second type for said alternate route or for a determined sub-alternate route for said alternate route.
20) The method according to embodiment 18 or 19, said method further comprising:
determining the number of sub-alternate routes for at least one of said determined alternate routes.
21) The method according to embodiment 20, wherein said selecting of one or more routes from said alternate routes is also based on the determined number of sub-alternate routes.
22) Method according to any of the embodiments 18-21, wherein a route from said alternate routes is selected based on a parameter, said parameter being based on one or more of
said determined costs of said first cost type for said alternate routes;
said determined costs of said second cost type for said alternate routes; and/or
said number of sub-alternate routes for respective alternate routes.
23) The method according to embodiment 22, wherein a route from said alternate routes is selected for which said parameter is maximal or minimal.
24) The method according to any of the embodiments 18-23, wherein said determining of said sub-alternate routes is based on an uninformed search algorithm.
25) The method according to any of the embodiments 18-24, wherein said determining of said sub-alternate routes comprises obtaining a tree structure for a respective alternate route, said tree structure comprising nodes of said transport network of said map.
26) The method according to embodiment 25, wherein said determining of sub-alternate routes comprises employing a depth-first search algorithm.
27) The method according to embodiment 25 or 26, wherein said tree structure for each node comprises child nodes equal or less than a maximum number.
28) The method according to any of the embodiments 25-27, wherein child nodes to be considered for a certain node of the tree structure are chosen based on a cost from said certain node to said child nodes.
29) The method according to any of the embodiments 25-28, wherein said determining of said number of sub-alternate routes is based on a leaf count of said tree structure.
30) The method according to any of the embodiments 25-29, wherein branches of said tree structure are associated with respective costs of said first cost type and/or of said second cost type for travelling a path represented by said branch.
31) The method according to any of the embodiments 25-30, wherein nodes of said tree structure are associated with respective costs of said first cost type and/or said second cost type for travelling from a position represented by a root of said tree structure to a position represented by said node.
32) The method according to any of the embodiments 1-31, wherein at least said determining or triggering determining of alternate routes between said first position and said second position at least based on costs of a first cost type for travelling a respective route and/or said determining or triggering determining of costs of a second cost type for travelling a respective route for at least one of said alternate routes is repeated.
33) The method according to any of the embodiments 1-32, wherein said determining of said alternate routes is based on an informed search algorithm and/or a best-first search algorithm, in particular an A* algorithm.
34) The method according to any of the embodiments 1-33, wherein said determining of said alternate routes comprises employing an A* algorithm implementing a priority queue comprising nodes of said transport network of said map, said algorithm comprising:
determining a first route between said first position and said second position by minimizing costs of said first cost type by running said A* algorithm;
modifying said priority queue by retaining nodes from said priority queue with a depth on the path from said first position to said second position below a predefined threshold and/or by removing nodes from said priority queue belonging to paths comprising parent nodes on the path from said first position to said second position above a predefined threshold;
determining a further route between said first position and said second position by minimizing costs of said first cost type by running said A* algorithm based on said modified priority queue;
optionally repeating said modifying of said priority queue and said determining of a further route based on said modified priority queue until a desired number of alternate routes is obtained.
35) The method according to embodiment 2 and 34, wherein said predefined threshold is an integer smaller than a number of nodes comprised by said first route from said first position to said second position.
36) The method according to any of the embodiments 1-35, wherein said at least one apparatus comprises:
a personal navigation device and/or
a server.
37) A computer program code, said computer program code, when executed by a processor, causing an apparatus to perform a method according to any of embodiment 1 to 36.
38) A non-transitory computer readable storage medium in which computer program code is stored, said computer program code when executed by a processor causing at least one apparatus to perform a method according to any of the embodiments 1 to 36.
39) An apparatus comprising means for performing a method according to any of the embodiments 1 to 36.
40) An apparatus comprising at least one processor and at least one memory including computer program code, wherein said at least one memory and said computer program code are configured to, with said at least one processor, cause said apparatus to perform a method according to any of the embodiments 1 to 36.

The invention claimed is:
1. A method performed by at least one apparatus, said method comprising:
obtaining, via a navigation device, a routing request for determining a route between a first position and a second position in a transport network of a map;
determining alternate routes between the first position and the second position at least based on costs of a first cost type for travelling a respective alternate route of the alternate routes;
determining costs of a second cost type for travelling the respective alternate route of the alternate routes, wherein the second cost type is based on a probability of an unexpected traffic event occurring on the respective alternate route, wherein the unexpected traffic event is identified by a deviation above a threshold of an actual traffic condition from a corresponding expectation of the traffic condition based on historic traffic data, the historic traffic data comprising information regarding unexpected traffic events produced by the respective alternate route; and
causing display of at least one alternate route of the alternate routes based at least on the costs of the second cost type associated with the at least one alternate route at the navigation device.

2. The method according to claim 1, wherein the alternate routes between the first position and the second position comprise a first route and one or more further routes, the one or more further routes being accessible when travelling the first route.

3. The method according to claim 2, wherein the one or more further routes are accessible from the first route in a first section of the first route, the first section being between the first position and a position between the first position and the second position.

4. The method according to claim 1, wherein the first cost type is representative of a time cost.

5. The method according to claim 1, wherein the unexpected traffic event on the respective alternate route is a traffic congestion surprise.

6. The method according to claim 1, wherein the probability of the unexpected traffic event is determined based on a frequentist probability.

7. The method according to claim 1, wherein the expected traffic condition is determined based on historical traffic condition data.

8. The method according to claim 1, wherein the transport network of the map comprises routing segments, and wherein the costs of the first cost type and/or the costs of the second cost type are associated with the routing segments of the transport network of the map.

9. The method according to claim 8, wherein the probability of the unexpected traffic event on a segment of the transport network of the map is based on a frequency of the unexpected traffic event on the segment compared to other segments of the transport network of the map.

10. The method according to claim 8, wherein the costs of the first cost type for travelling the respective alternate route are determined by combining the costs of the first cost type associated with segments comprised by the respective alternate route.

11. The method according to claim 8, wherein the costs of the second cost type for travelling a respective route are determined by combining costs of the second cost type associated with segments comprised by the respective alternate route.

12. The method according to claim 11, wherein the combining of the costs of the second cost type associated with segments comprised by the respective alternate route comprises weighting the costs of the second cost type.

13. The method according to claim 1, wherein the costs of the first cost type and/or the second cost type are time-dependent.

14. The method according to claim 1, further comprising:
providing information based on the costs of the second cost type.

15. The method according to claim 1, further comprising:
selecting one or more alternate routes from the alternate routes at least based on the costs of the second cost type.

16. The method according to claim 1, wherein the alternate routes equal to or less than a maximum number are determined.

17. The method according to claim 1, further comprising:
determining sub-alternate routes for at least one of the alternate routes.

18. The method according to claim 17, wherein the costs of the second cost type for travelling an alternate route are for the alternate route or for a sub-alternate route for the alternate route.

19. The method according to claim 17, further comprising:
determining a number of sub-alternate routes for at least one of the alternate routes.

20. The method according to claim 19, wherein the selecting of the one or more alternate routes from the alternate routes is also based on the number of sub-alternate routes.

21. The method according to claim 17, wherein at least one alternate route from the alternate routes is selected based on a parameter, the parameter being based on one or more of
the costs of the first cost type for the alternate routes;
the determined costs of the second cost type for the alternate routes; and/or
a number of sub-alternate routes for the alternate routes.

22. The method according to claim 21, wherein at least one alternate route from the alternate routes is selected for which the parameter is maximal or minimal.

23. The method according to claim 17, wherein the determining of the sub-alternate routes is based on an uninformed search algorithm.

24. The method according to claim 17, wherein the determining of the sub-alternate routes comprises obtaining a tree structure for a respective alternate route, said tree structure comprising nodes of the transport network of the map.

25. The method according to claim 24, wherein the determining of the sub-alternate routes comprises employing a depth-first search algorithm.

26. The method according to claim 24, wherein each node of the nodes of the tree structure comprises child nodes equal to or less than a maximum number.

27. The method according to claim 24, wherein child nodes to be considered for a certain node of the tree structure are chosen based on a cost from the certain node to the child nodes.

28. The method according to claim 24, wherein a determining of a number of sub-alternate routes is based on a leaf count of the tree structure.

29. The method according to claim 24, wherein branches of the tree structure are associated with respective costs of the first cost type and/or of the second cost type for travelling a path represented by the branches.

30. The method according to claim 24, wherein the nodes of the tree structure are associated with respective costs of the first cost type and/or the second cost type for travelling from a position represented by a root of the tree structure to a position represented by the node.

31. The method according to claim 1, wherein at least the determining of alternate routes between the first position and the second position at least based on the costs of the first cost type for travelling the respective alternate route and/or the determining of the costs of the second cost type for travelling the respective alternate route for at least one of the alternate routes is repeated.

32. The method according to claim 1, wherein the determining of the alternate routes is based on an informed search algorithm and/or a best-first search algorithm, in particular an A* algorithm.

33. The method according to claim 1, wherein the determining of the alternate routes comprises employing an A* algorithm implementing a priority queue comprising nodes of the transport network of the map, the A* algorithm comprising:
  determining a first route between the first position and the second position by minimizing the costs of the first cost type by running the A* algorithm;
  modifying the priority queue by retaining the nodes from the priority queue with a depth on a path from the first position to the second position below a predefined threshold and/or by removing the nodes from said priority queue belonging to paths comprising parent nodes on the path from the first position to the second position above the predefined threshold;
  determining a further route between the first position and the second position by minimizing the costs of the first cost type by running the A* algorithm based on the modified priority queue; and
  optionally repeating the modifying of the priority queue and the determining of the further route based on the modified priority queue until a desired number of alternate routes is obtained.

34. The method according to claim 33, wherein the predefined threshold is an integer smaller than a number of nodes comprised by the first route from the first position to the second position.

35. The method according to claim 1, wherein the at least one apparatus comprises:
  a personal navigation device and/or
  a server.

36. The method of claim 1, wherein the at least one alternate route that is caused for display is associated with a cost of the costs of the second cost type that has an ordered relationship to other costs of the second cost type of the alternate routes.

37. A non-transitory computer readable storage medium in which computer program code is stored, said computer program code when executed by a processor causing at least one apparatus to perform a method, said method comprising:
  obtaining, via a navigation device, a routing request for determining a route between a first position and a second position in a transport network of a map;
  determining alternate routes between the first position and the second position at least based on costs of a first cost type for travelling a respective alternate route of the alternate routes;
  determining costs of a second cost type for travelling the respective alternate route of the alternate routes, wherein the second cost type is based on a probability of an unexpected traffic event occurring on the respective alternate route, wherein the unexpected traffic event is identified by a deviation above a threshold of an actual traffic condition from a corresponding expectation of the traffic condition based on historic traffic data, the historic traffic data comprising information regarding unexpected traffic events produced by the respective alternate route; and
  causing display of at least one alternate route of the alternate routes based at least on the costs of the second cost type associated with the at least one alternate route at the navigation device.

38. An apparatus comprising at least one processor and at least one memory including computer program code, wherein said at least one memory and said computer program code are configured to, with said at least one processor, cause said apparatus to perform a method, said method comprising:
  obtaining, via a navigation device, a routing request for determining a route between a first position and a second position in a transport network of a map;
  determining alternate routes between the first position and the second position at least based on costs of a first cost type for travelling a respective alternate route of the alternate routes;
  determining costs of a second cost type for travelling the respective alternate route of the alternate routes, wherein the second cost type is based on a probability of an unexpected traffic event occurring on the respective alternate route, wherein the unexpected traffic event is identified by a deviation above a threshold of an actual traffic condition from a corresponding expectation of the traffic condition based on historic traffic data, the historic traffic data comprising information regarding unexpected traffic events produced by the respective alternate route; and
  causing display of at least one alternate route of the alternate routes based at least on the costs of the second cost type associated with the at least one alternate route at the navigation device.

* * * * *

UNITED STATES PATENT AND TRADEMARK OFFICE
CERTIFICATE OF CORRECTION

PATENT NO. : 11,125,574 B2
APPLICATION NO. : 15/962745
DATED : September 21, 2021
INVENTOR(S) : Fowe Page 1 of 1

It is certified that error appears in the above-identified patent and that said Letters Patent is hereby corrected as shown below:

In the Claims

Column 26,
Line 41, "the determined costs" should read --the costs--.

Signed and Sealed this
Twenty-seventh Day of September, 2022

Katherine Kelly Vidal
*Director of the United States Patent and Trademark Office*